US012568938B2

(12) United States Patent
Risser et al.

(10) Patent No.: US 12,568,938 B2
(45) Date of Patent: Mar. 10, 2026

(54) COLONY NEST EXPELLER

(71) Applicant: Valco Industries, Inc., New Holland, PA (US)

(72) Inventors: Philip E. Risser, Leola, PA (US); Douglas Scott Bertke, Coldwater, OH (US)

(73) Assignee: Valco Industries, Inc.

( * ) Notice: Subject to any disclaimer, the term of this patent is extended or adjusted under 35 U.S.C. 154(b) by 0 days.

(21) Appl. No.: 19/034,968

(22) Filed: Jan. 23, 2025

(65) Prior Publication Data

US 2025/0234844 A1     Jul. 24, 2025

Related U.S. Application Data

(60) Provisional application No. 63/624,427, filed on Jan. 24, 2024.

(51) Int. Cl.
| | |
|---|---|
| *A01K 31/16* | (2006.01) |
| *A01K 45/00* | (2006.01) |
| *A01M 29/32* | (2011.01) |

(52) U.S. Cl.
CPC .............. *A01K 31/16* (2013.01); *A01K 45/00* (2013.01); *A01M 29/32* (2013.01)

(58) Field of Classification Search
CPC ........ A01K 31/16; A01K 45/00; A01M 29/32
USPC ......................... 119/329, 334, 339, 428, 752
See application file for complete search history.

(56) References Cited

U.S. PATENT DOCUMENTS

| | | | | |
|---|---|---|---|---|
| 1,523,256 | A | * | 1/1925 | Butler .................... A01K 31/16 119/344 |
| 2,539,052 | A | * | 1/1951 | Birky ..................... A01K 31/16 119/344 |
| 3,027,871 | A | * | 4/1962 | Peterson ................ A01K 31/16 119/329 |
| 3,139,065 | A | * | 6/1964 | Willauer, Jr. .......... A01K 31/16 119/337 |
| 3,157,156 | A | * | 11/1964 | Peterson ................ A01K 31/16 119/337 |
| 3,234,909 | A | * | 2/1966 | Graves ................... A01K 31/16 119/337 |
| 3,292,583 | A | * | 12/1966 | Peterson ................ A01K 31/16 119/329 |
| 4,188,911 | A | * | 2/1980 | Rafaely ................. A01K 31/16 119/329 |
| 4,889,076 | A | * | 12/1989 | Cohen .................... A01K 31/10 119/339 |
| 5,143,021 | A | * | 9/1992 | Shaley ................... A01K 31/16 119/330 |
| 5,222,459 | A | * | 6/1993 | Johnson ................. A01K 31/16 119/330 |

(Continued)

*Primary Examiner* — Zoe Tam Tran
(74) *Attorney, Agent, or Firm* — Duane Morris LLP

(57) ABSTRACT

Disclosed is an improved poultry nest structure that includes an expeller mechanism that can be actuated to urge any birds that are in the interior space toward the entry/exit opening and leave the nest. The expeller mechanism includes an expeller panel that is provided in the interior space and configured to be actuated in a rotating manner to push or direct the birds to leave the nest where the expeller panel is attached to and hangs from a rotating axle that is connected to at least one arm so that the arm can be actuated to rotate the expeller panel about the rotating axle to direct the birds to leave the nest.

8 Claims, 7 Drawing Sheets

(56)                    References Cited

U.S. PATENT DOCUMENTS

| | | | | |
|---|---|---|---|---|
| 5,950,564 A * | 9/1999 | Meron | ................. | A01K 1/0029 |
| | | | | 119/332 |
| 11,553,696 B2 * | 1/2023 | Martoni | ................. | A01K 31/16 |
| 2015/0351370 A1 * | 12/2015 | Donker | ................. | A01K 31/16 |
| | | | | 119/347 |

* cited by examiner

100

150

150

150

150e

153

150

195

190

COLONY NEST EXPELLER

CROSS-REFERENCE TO RELATED APPLICATIONS

This application claims priority under 35 U.S.C. § 119 (e) to U.S. Provisional Application No. 63/624,427, filed on Jan. 24, 2024, the entirety of which is incorporated herein by reference.

FIELD

This disclosure generally relates to poultry nest systems and more particularly relates to poultry nest systems that utilize one or more expelling mechanism to direct birds that are inside the nest to leave the nest after laying an egg.

BACKGROUND

FIGS. 1-3 are schematic illustrations of an example of an existing poultry nest system 100 that comprises one or more nests where each nest utilizes an expeller mechanism to direct birds that are inside the nest to leave the nest after laying an egg. The expeller mechanism can be actuated to urge any birds that are in the interior space of the nest toward an entry/exit opening and leave the nest.

The expeller mechanism in the poultry nest system 100 is a panel 110 (see FIGS. 2A, 2B) that is positioned inside the nest 100 that can be actuated in a rotating manner to push or direct the birds that are in the nest to leave the nest. Such expeller panel 110 is attached to and hangs from an axle (i.e. a shaft) 153. The rotating axle 153 is connected to at least one arm 150 so that the arm 150 can be actuated to rotate or swing the expeller panel 110 about the rotating axle 153 between a first position and a second position.

The nest system 100 generally has some curtains 190 to provide the birds some privacy and an entry/exit opening 195. The nest system 100 is an example where two nest structures are provided back-to-back with the two associated entry/exit openings 195 facing in opposite directions. This can be better seen in FIGS. 2A and 2B. In FIG. 2A, the two nest structures are each identified as 100A and 100B outlined by a dot-dash line. Inside the nest system 100 are two nest structures, one on the left hand side and another on the right hand side positioned back-to-back with their associated entry/exit openings 195 facing in opposite directions.

FIGS. 2A and 2B show partial cutaway views of the poultry nest system 100 showing the expeller panel 110 that is provided inside the nest system 100. Because the at least one arm 150 and the expeller panel 110 are both connected to the rotating axle 153, rotating or turning the arm 150 about the rotating axle 153, in turn, rotates the expeller panel 110 about the rotating axle 153. These motions are noted by the arrows A and B marked on the right hand side of FIG. 2A where a cutaway view shows the expeller panel 110 in the interior of the poultry nest system 100. This rotating motion of the expeller panel 110 moves the expeller panel 110 between its first position and second position.

In FIG. 2A, both arms 150 are in their first position. In their first position, the associated expeller panels 110 inside the nest are in their first position that does not obstruct the entry/exit opening 195 and allows the birds to enter into the interior space S via the entry/exit opening 195 where they can lay eggs.

In FIG. 2B, the arm 150 on the right hand side of the poultry nest system 100 has been rotated in the direction of the arrow A and is in its second position. In turn, the associated expeller panel 110 inside the nest is in its second position. In the second position, the expeller panel 110 has been fully rotated in the direction of the arrow B and toward the entry/exit opening 195. During the transition from the first position to the second position, the expeller panel 110 rotates toward the entry/exit opening 195 and urge any birds that were in the interior space S of the nest system 100 toward the entry/exit opening 195 and leave the nest.

In FIG. 2A, the arrow A denotes the direction of the arm 150 being rotated upward. The arrow B denotes the direction of the resulting motion of the expeller panel 110 which advancing toward the entry/exit opening 195. Any bird that is in the nest interior space S would be pushed by the expeller panel 110 toward and out the entry/exit opening 195.

In the conventional poultry nest system 100, the arms 150 are actuated by cables 55 connected to the ends of the arms 150 as shown in FIG. 2A. A winch and pulley system (not shown) can be utilized to pull on the cables 55 in the direction of the arrow A to actuate the arms 150 and, in turn, the expeller panels 110. To return the expeller panels 110 to their first position, the tension on the cables 55 is released, then a constant force spring (not shown) that is connected to each of the expeller panels 110 can be utilized to pull the expeller panels 110 back to the first position.

In large egg production facilities, it is generally desirable to configure the poultry nest systems so that they are positioned end-to-end as shown in FIG. 3. However, with the conventional poultry nest system 100 having the straight arms 150 prevents the nests 100 from being positioned closely in an end-to-end configuration. The end-to-end configuration results in there being a too large a gap G between the nests. The large gap G allows dirt and debris to collect between the nests, build up on components, which can hold moisture and promote corrosion of metal components. Furthermore, the gap G cannot be effectively covered because the arms 150, which swing up above the roof line of the nests (their second position as shown in FIG. 2B) and back down as the expeller panels 110 are actuated, would interfere with any type of covering over the gap G. Often, the expeller panels 110 will be in their second position (i.e., the expelling position) for several hours at a time and this would exacerbate the problem because more of the gap G is exposed for debris and dirt to fall into the gap G.

Therefore, there is a need for improved poultry nest systems.

SUMMARY

Disclosed is a poultry nest structure according to some embodiments. The poultry nest structure comprises:

a front edge;

an interior space;

an entry/exit opening;

an expeller mechanism that can be actuated to urge any birds that are in the interior space toward the entry/exit opening and leave the nest, wherein the expeller mechanism comprises:

an expeller panel that is provided in the interior space and configured to be actuated in a rotating manner to push or direct the birds to leave the nest, wherein the expeller panel is attached to and hangs from a rotating axle, wherein the rotating axle is connected to at least one arm so that the arm can be actuated to rotate or swing the expeller panel about the rotating axle to direct the birds to leave the nest, wherein the at least one arm and the expeller panel are both connected to the rotating axle, whereby the expeller panel can be transitioned from a first position to a second position by rotating the at least one arm about the rotating axle, wherein when the expeller panel is in its first position, the entry/exit opening is not obstructed by the expeller panel so that birds can enter into the interior space to lay eggs, as the expeller panel is transitioning from its first position to its second position, the expeller panel rotates toward the entry/exit opening, thus, urging any birds that are in the interior space toward the entry/exit opening and leave the nest.

According to some embodiments, also disclosed is a poultry nest system comprising two poultry nest structures that are positioned in a back-to-back configuration, where each of the two poultry nest structure comprises:

a front edge;

an interior space;

an entry/exit opening;

an expeller mechanism that can be actuated to urge any birds that are in the interior space toward the entry/exit opening and leave the nest, wherein the expeller mechanism comprises:

an expeller panel that is provided in the interior space and configured to be actuated in a rotating manner to push or direct the birds to leave the nest, wherein the expeller panel is attached to and hangs from a rotating axle, wherein the rotating axle is connected to at least one arm so that the arm can be actuated to rotate or swing the expeller panel about the rotating axle to direct the birds to leave the nest, wherein the at least one arm and the expeller panel are both connected to the rotating axle, whereby the expeller panel can be transitioned from a first position to a second position by rotating the at least one arm about the rotating axle, wherein when the expeller panel is in its first position, the entry/exit opening is not obstructed by the expeller panel so that birds can enter into the interior space to lay eggs, as the expeller panel is transitioning from its first position to its second position, the expeller panel rotates toward the entry/exit opening, thus, urging any birds that are in the interior space toward the entry/exit opening and leave the nest.

DETAILED DESCRIPTION

Figure 1:
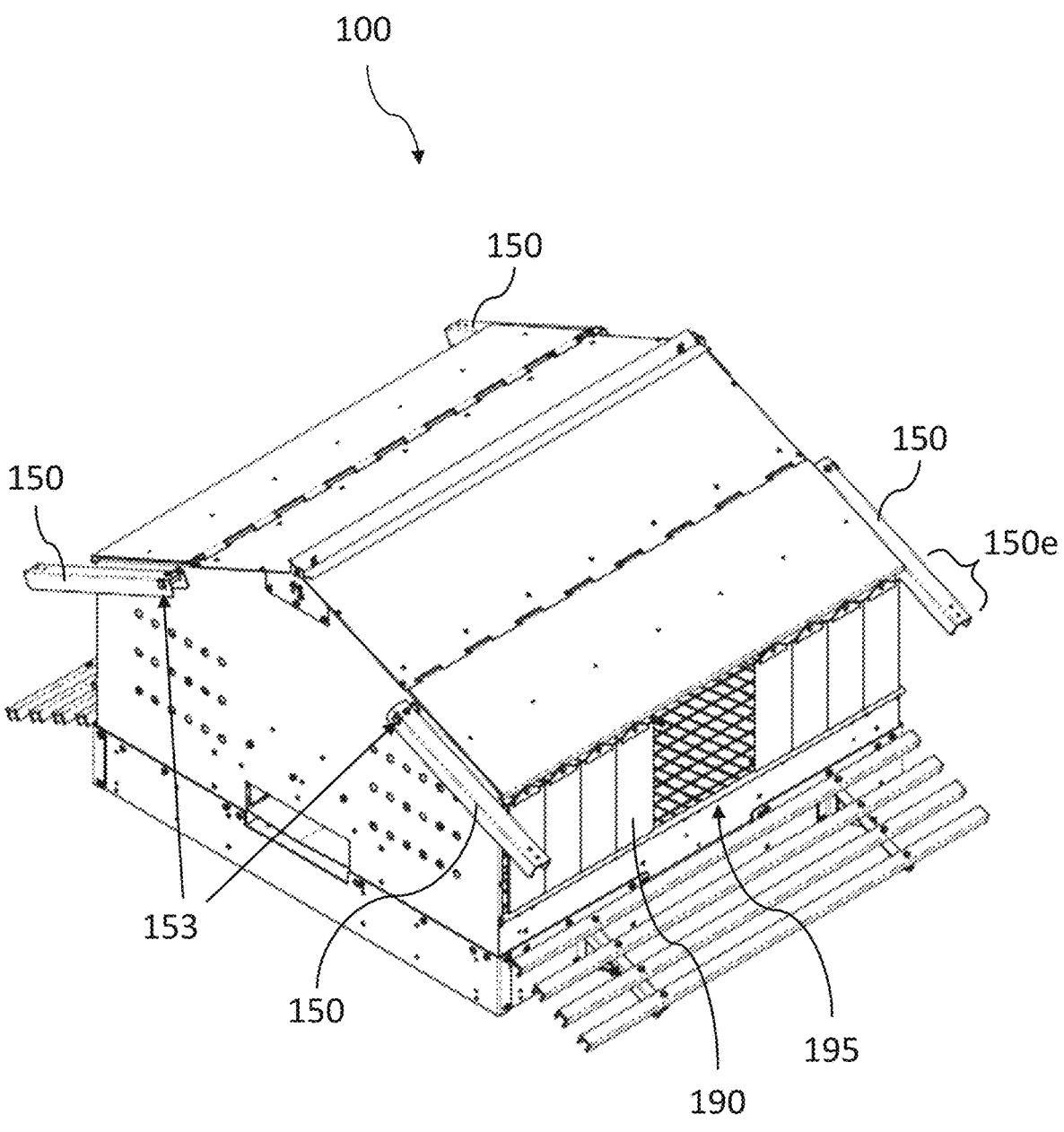
FIG. 1 is a schematic illustration of an example of an existing conventional poultry nest system.
Figure 2A:
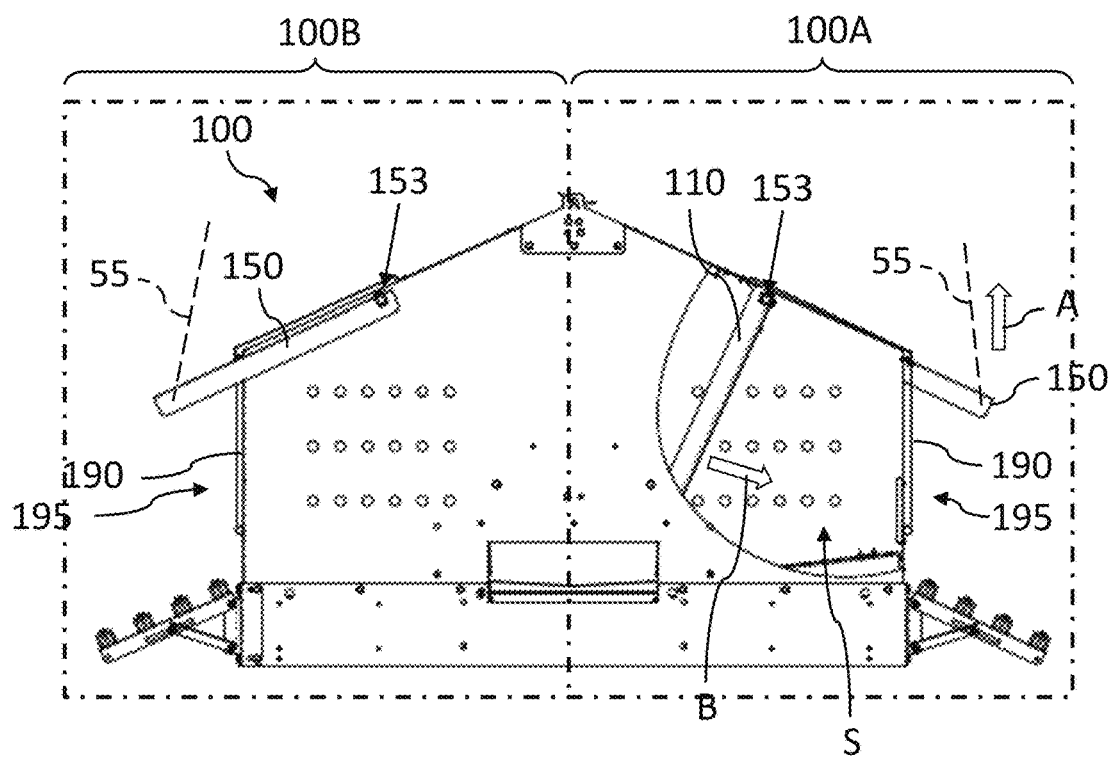
FIGS. 2A and 2B are partial cutaway views of the existing conventional poultry nest system shown in FIG. 1.
Figure 2B:
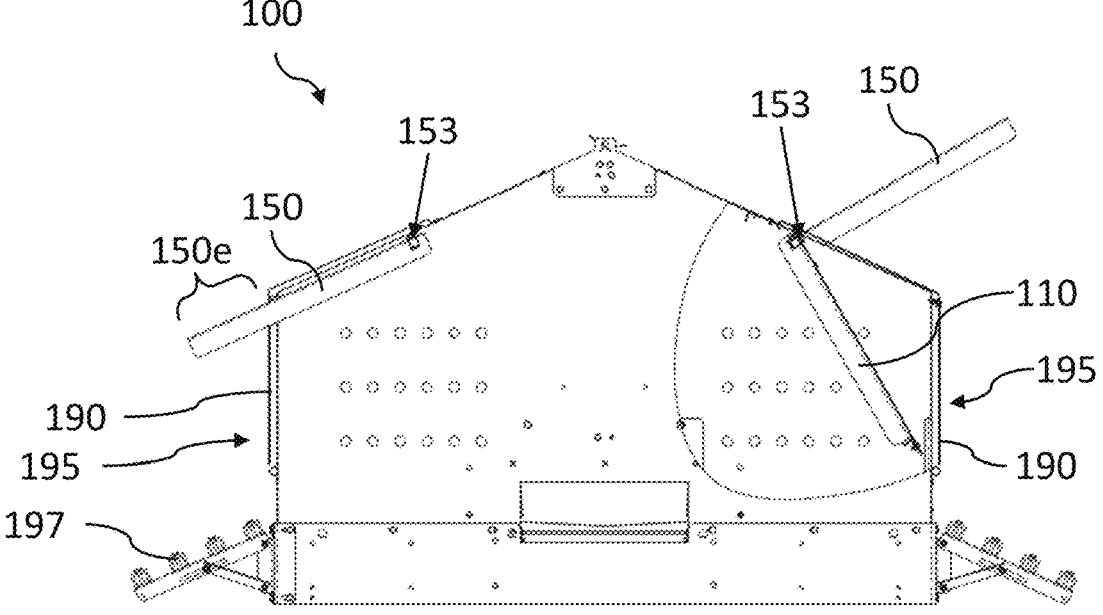
Figure 3:
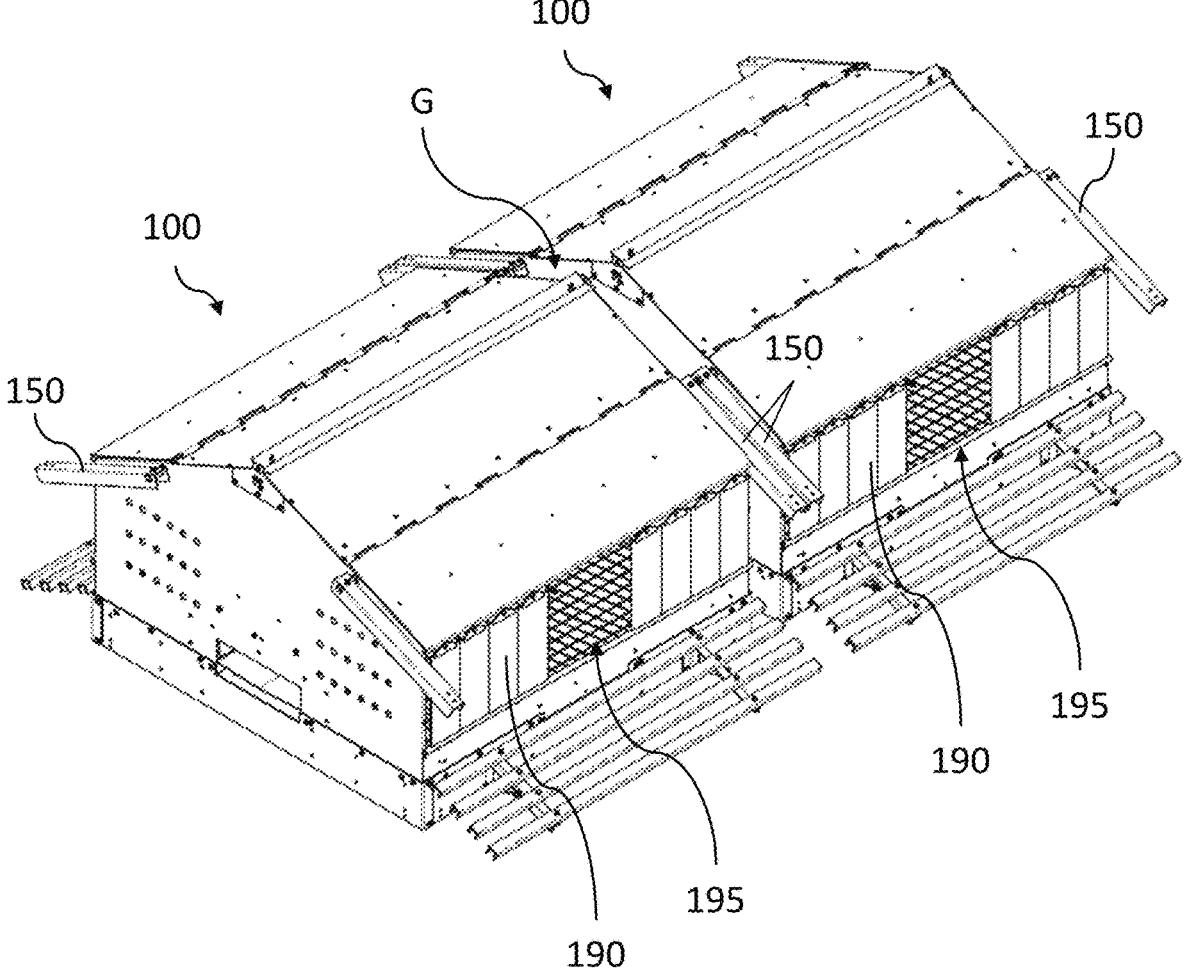
FIG. 3 is a schematic illustration of two of the existing conventional poultry nest system shown in FIG. 1 arranged in a side-by-side configuration.
Figure 4:
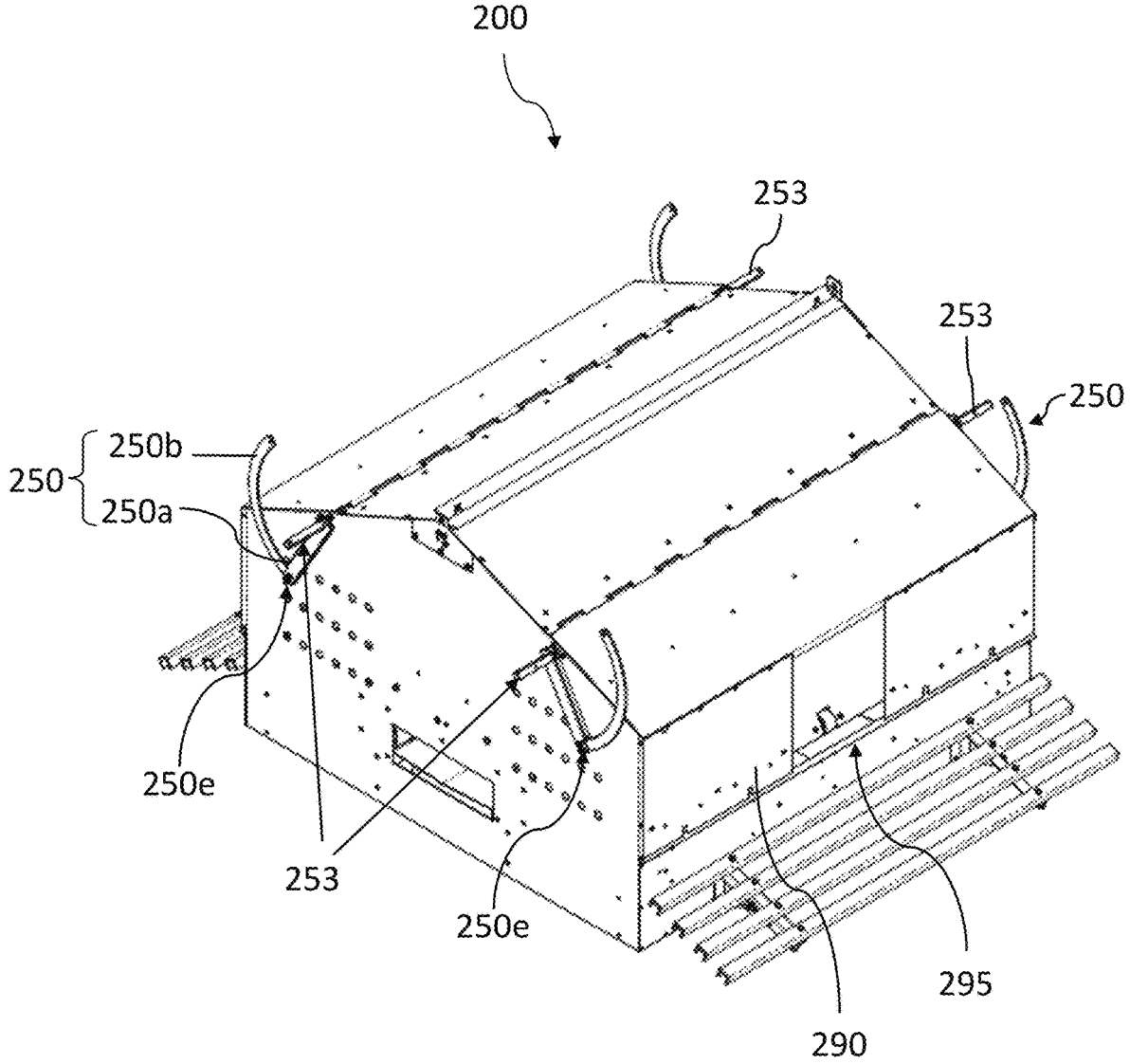
FIG. 4 is a schematic illustration of an example of a new and improved poultry nest system according to the present disclosure.
Figure 5A:
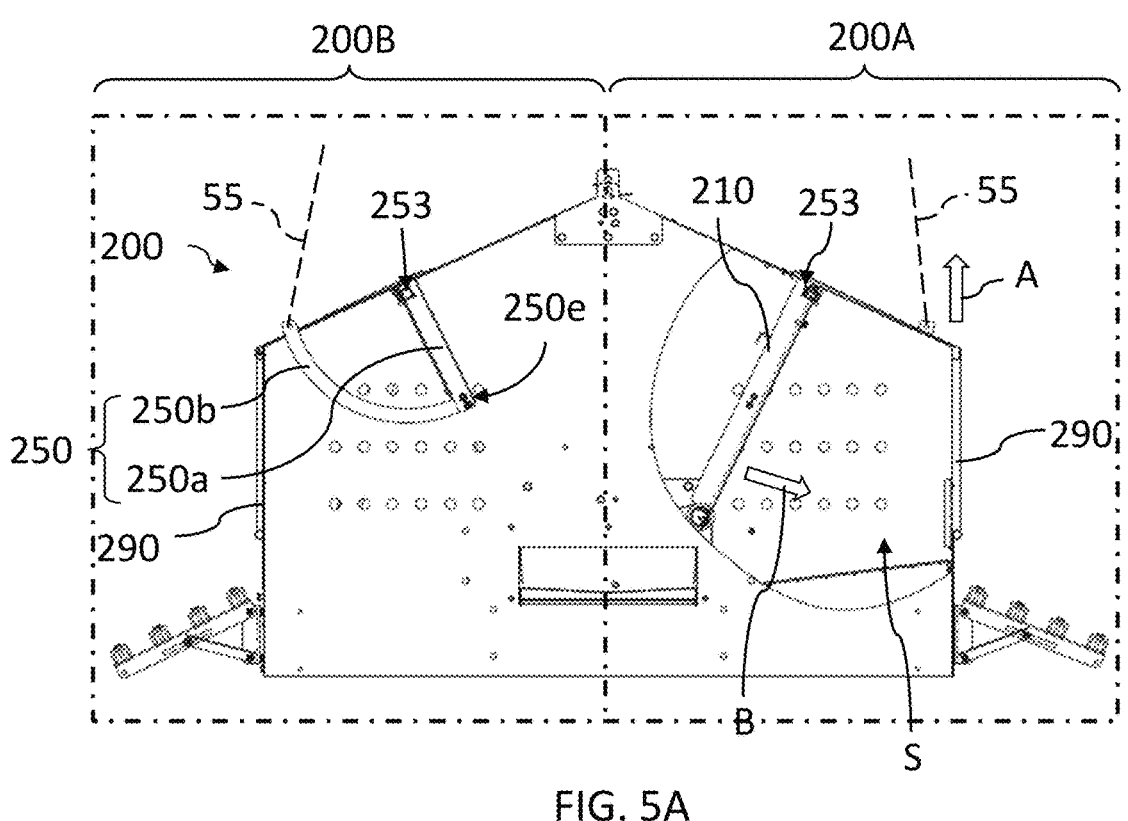
FIGS. 5A and 5B are partial cutaway views of the new and improved poultry nest system shown in FIG. 4.
Figure 5B:
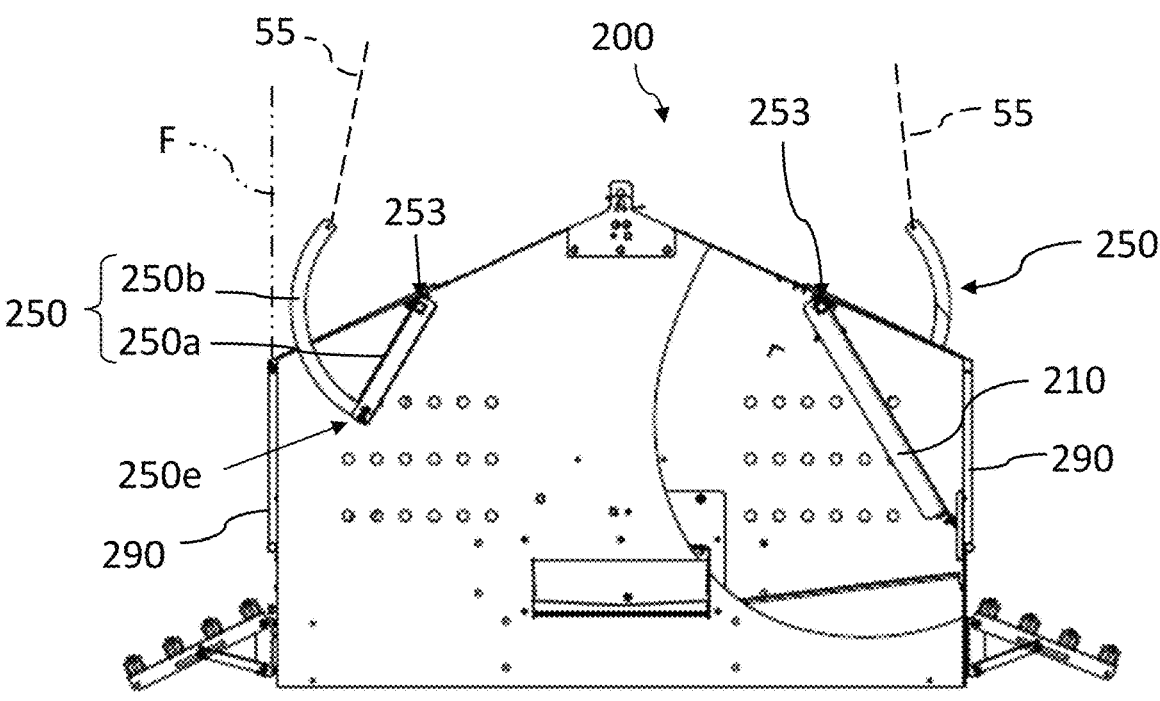
Figure 5C:
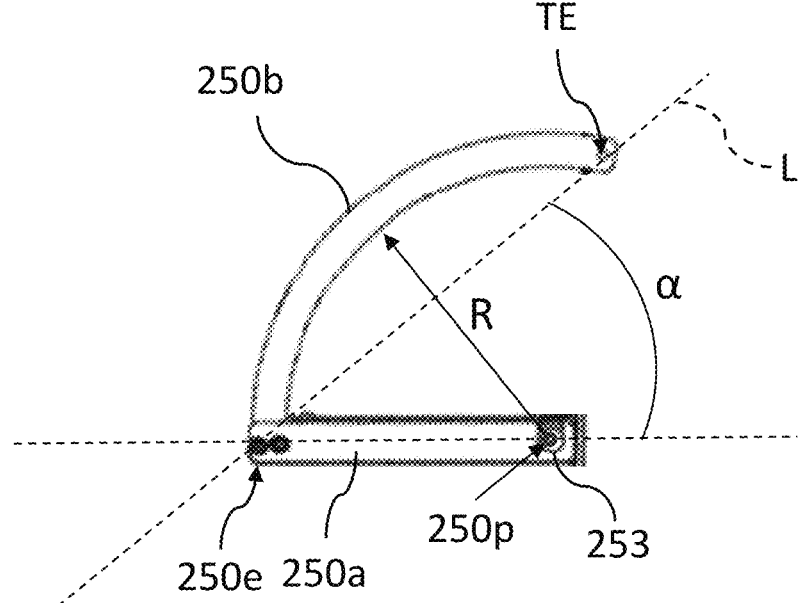
FIG. 5C is a detailed schematic view of an arm component of the new and improved poultry nest system of the present disclosure.
Figure 6:
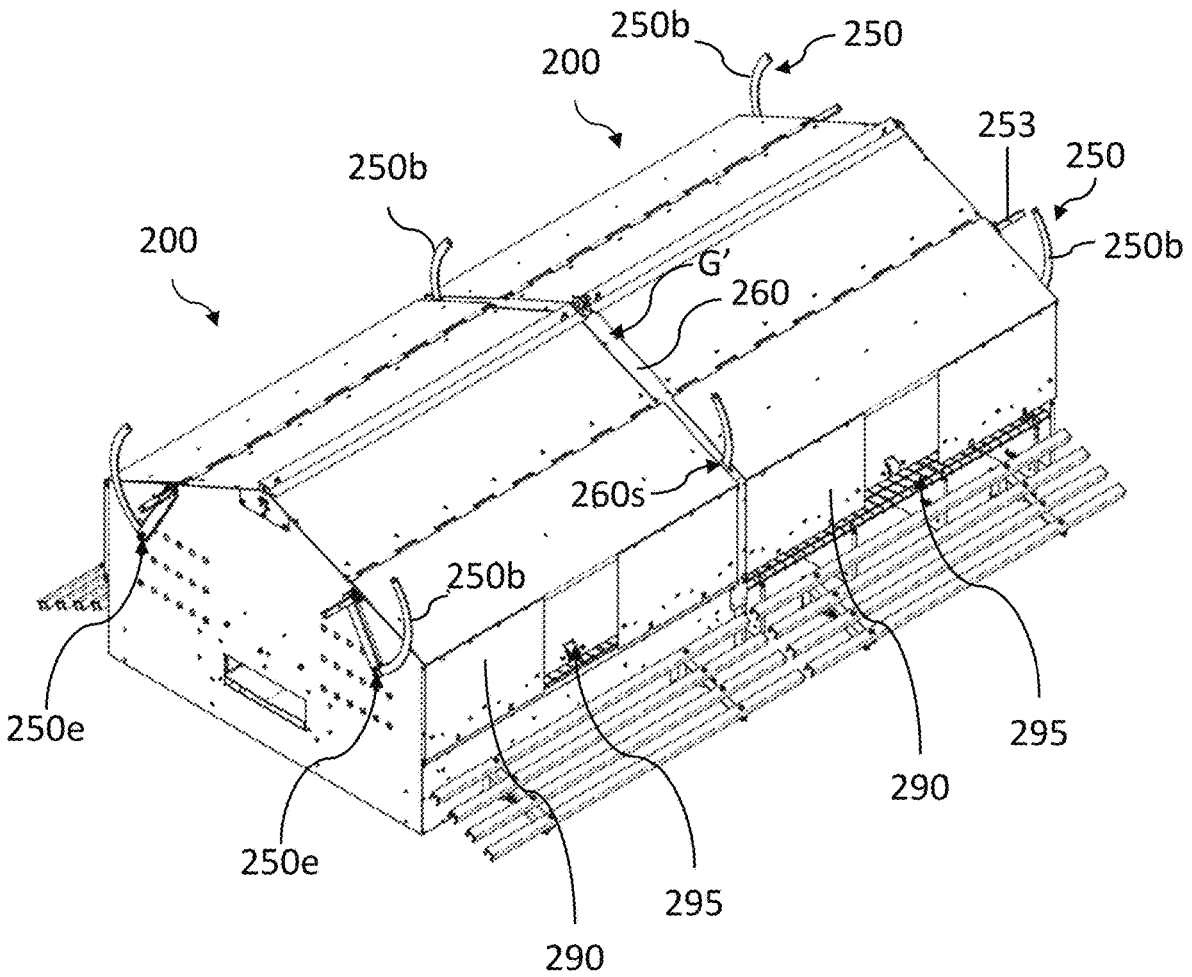
FIG. 6 is a schematic illustration of two of the new and improved poultry nest system shown in FIG. 4 arranged in a side-by-side configuration.

FIGS. 4-6 show schematic illustrations of a new and improved poultry nest system 200 that comprises an expeller mechanism that can be actuated to urge or direct any birds that are in the nest's interior space S toward an entry/exit opening 295 and leave the nest. FIGS. 5A and 5B, respectively show partial cutaway views of the improved poultry nest system 200 showing the expeller panel 210 that is provided inside the nest system 200. Similar to the conventional poultry nest system 100 described in connection with FIGS. 1-3, the expeller panel 210 is actuated by actuating at least one arm 250 that is associated with the expeller panel 210.

The nest system 200 can generally include some curtains 290 to provide the birds some privacy. The nest system 200 also comprises at least one entry/exit opening 295.

Referring to FIGS. 5A and 5B, the expeller panel 210 is attached to and hangs from a rotating axle (i.e. a shaft) 253. The rotating axle 253 is connected to at least one arm 250 so that the arm 250 can be actuated to rotate along the rotating axle's longitudinal axis which, in turn, swings the expeller panel 210 about the rotating axle 253 towards the entry/exit opening 295 and urge and direct any birds that are in the interior space S toward the entry/exit opening 295 and leave the nest. In the illustrations shown in FIGS. 5A and 5B, the rotating axle 253 and its longitudinal axis are oriented orthogonal to the plane of the paper.

The nest system 200 is an example where two nest structures 200A and 200B are provided in back-to-back arrangement within the nest system 200. In FIG. 5A, the two nest structures 200A and 200B are outlined by a dot-dash line. Each nest structure comprises its own set of expeller panel 210 and associated arm 250, and at least one entry/exit opening 295. The nest structures are positioned back-to-back so that the entry/exit openings 295 associated with each of the two nest structures are facing in opposite directions. This can be better seen in FIGS. 5A and 5B.

Because the at least one arm 250 and the expeller panel 210 are both connected to the rotating axle 253, rotating or turning the arm 250 about the rotating axle 253, in turn, rotates the expeller panel 210 about the rotating axle 253. These motions are noted by the arrows A and B in FIG. 5A. In FIG. 5A, the expeller panel 210 inside the nest is in its first position that allows the birds to enter the interior space S and lay eggs. In FIG. 5B, the expeller panel 210 inside the nest is in its second position. In the second position, the expeller panel 210 has been fully rotated toward the entry/ exit opening 295. When the expeller panel 210 is transitioning from its first position to its second position, because the expeller panel 210 is swinging and moving towards the entry/exit opening 295, the expeller panel urges and directs any birds that are in the interior space S toward the entry/exit opening 295 and leave the nest.

In the improved poultry nest system 200, the at least one arm 250 is configured so that it comprises two parts, a first portion 250a and a second portion 250b that are rigidly connected at an elbow 250e. See FIGS. 5A and 5B.

Referring to FIGS. 5A and 5B, the arms 250 are actuated by cables 55 connected to the ends of the arms 250. A winch and pulley system (not shown) can be utilized to pull on the cables 55 in the direction of the arrow A (see FIG. 5A) to actuate the arms 250 and, in turn, rotate the expeller panel 210 to its second position shown in FIG. 5B. To return the expeller panels 210 to their first position, the tension on the cables 55 is released, then a constant force spring (not shown) that is connected to each of the expeller panels 210 can be utilized to pull the expeller panels 210 back to the first position.

Referring to FIG. 5C, the first portion 250*a* and the second portion 250*b* are connected at the elbow 250*e* and the second portion 250*b* is configured to be swept backwards (i.e. toward the pivoting point 250*p* of the arm 250 which is where the first portion 250*a* is pivotally connected to the rotating axle 253) so that the first portion 250*a* and a line L connecting the elbow 250*e* to the terminal end TE of the second portion 250*b* form an acute angle α. The length of the first portion 250*a* is limited so that unlike the arm 150 of the conventional nest system 100, the first portion 250*a* does not protrude and extend beyond the front edge of the nest system 200. The front edge of the nest system 200 is marked by the dashed line F shown in FIG. 5B. This allows the nests to be closer to each other without having a connecting trough between the nests. As the cables 55 can be pulled by a winch, the arched second portion 250*b* of the arms 250 rotate about the pivot point of the expeller, which is the rotating axle 253, allowing for minimal interaction with the birds around the nests. This also allows less obstruction in front of the nests giving the birds more area to move and allowing humans and equipment to get closer to the nests without interfering with the cables 55. This also allows a shorter travel of the winch components needed to move the expeller panels 210.

In some embodiments, the second portion 250*b* can be configured with a curvature as shown in the example embodiments shown in FIGS. 4, 5A, and 5B. In the illustrated example, the curvature of the second portion 250*b* has a constant radius R so that the curvature is an arc of a circle. This not only allows the second portion 250*b* to extend no farther than the length of the first portion 250*a* throughout the full range of motion of the arm 250 as the arm moves between the first position shown in FIG. 5A to the second position shown in FIG. 5B, but also provides an important benefit of allowing the gap G' between the two poultry nest systems 200, when the nests are placed end-to-end as shown in FIG. 6, to be almost fully or substantially covered with a cover 260. Because the only structure that extends up out of the gap G' is the curved second portion 250*b* of the arm 250 the cover 260 can extend the full length of the gap G' with a small slot opening 260*s* provided in the cover 260 to accommodate the curved second portion 250*b*. Because the cover 260 covers the full length of the gap G', buildup of dirt and debris between the nest systems 200 is minimized. The cover 260 also prevent birds from getting stuck in the gap G'.

Because the curved second portion 250*b* has a circular arc curvature, as the arm 250 is pulled upwards by the cable 55 and rotate about the rotating axle 253, the second portion 250*b* intersects the cover 260 at a stationary spot as the second portion 250*b* extends upward. That stationary spot is where the small slot 260*s* is provided in the cover 260 to accommodate the second portion 250*b*. The arched second portion 250*b* will pass through only the slot 260*s* part of the cover 260 throughout the arm 250's full range of motion without interfering with the cover 260.

Alternatively, however, the second portion 250*b* can have different curvatures, irregular shape, or can be straight but still provide one benefit of not protruding beyond the front edge F of the nest as long as the terminal end TE of the second portion 250*b* and the first portion 250*a* maintains the acute angle α.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A poultry nest structure comprising:
a front edge;
an interior space;
an entry/exit opening;
an expeller mechanism that can be actuated to urge any birds that are in the interior space toward the entry/exit opening and leave the nest, wherein the expeller mechanism comprises an expeller panel that is provided in the interior space and configured to be actuated in a rotating manner to push or direct the birds to leave the nest, wherein the expeller panel is attached to and hangs from a rotating axle, wherein the rotating axle is connected to at least one arm so that the arm can be actuated to rotate or swing the expeller panel about the rotating axle to direct the birds to leave the nest, wherein the at least one arm and the expeller panel are both connected to the rotating axle, whereby the expeller panel can be transitioned from a first position to a second position by rotating the at least one arm about the rotating axle, wherein when the expeller panel is in its first position, the entry/exit opening is not obstructed by the expeller panel so that birds can enter into the interior space to lay eggs, wherein as the expeller panel is transitioning from its first position to its second position, the expeller panel rotates toward the entry/exit opening urging any birds that are in the interior space toward the entry/exit opening and leave the nest, wherein the at least one arm comprises two parts, a first portion and a second portion that are rigidly connected at an elbow, and wherein the first portion and the second portion are connected at the elbow, and the second portion is configured to be swept backwards toward the pivoting point of the arm which is where the first portion is connected to the rotating axle so that the first portion and a line connecting the elbow to the terminal end of the second portion form an acute angle.

2. The poultry nest structure of claim 1, wherein the first portion has a length that is limited so that the first portion does not protrude outward extending beyond the front edge of the nest.

3. The poultry nest structure of claim 1, wherein the second portion is configured with a curvature that has a constant radius.

4. The poultry nest structure of claim 2, wherein the second portion is configured with a curvature that has a constant radius.

5. A poultry nest system comprising two poultry nest structures that are positioned in a back-to-back configuration, wherein each of the two poultry nest structures comprises:

a front edge;

an interior space;

an entry/exit opening;

an expeller mechanism that can be actuated to urge any birds that are in the interior space toward the entry/exit opening and leave the nest, wherein the expeller mechanism comprises an expeller panel that is provided in the interior space and configured to be actuated in a rotating manner to push or direct the birds to leave the nest, wherein the expeller panel is attached to and hangs from a rotating axle, wherein the rotating axle is connected to at least one arm so that the arm can be actuated to rotate or swing the expeller panel about the rotating axle to direct the birds to leave the nest, wherein the at least one arm and the expeller panel are both connected to the rotating axle, whereby the expeller panel can be transitioned from a first position to a second position by rotating the at least one arm about the rotating axle, wherein when the expeller panel is in its first position, the entry/exit opening is not obstructed by the expeller panel so that birds can enter into the interior space to lay eggs, wherein as the expeller panel is transitioning from its first position to its second position, the expeller panel rotates toward the entry/exit opening, thus, urging any birds that are in the interior space toward the entry/exit opening and leave the nest, wherein the at least one arm comprises two parts, a first portion and a second portion that are rigidly connected at an elbow, and wherein the first portion and the second portion are connected at the elbow, and the second portion is configured to be swept backwards toward the pivoting point of the arm which is where the first portion is connected to the rotating axle so that the first portion and a line connecting the elbow to the terminal end of the second portion form an acute angle.

6. The poultry nest system of claim 5, wherein the first portion has a length that is limited so that the first portion does not protrude outward extending beyond the front edge of the nest.

7. The poultry nest system of claim 5, wherein the second portion is configured with a curvature that has a constant radius.

8. The poultry nest system of claim 6, wherein the second portion is configured with a curvature that has a constant radius.

* * * * *